(12) United States Patent
Kitagawa

(10) Patent No.: US 6,943,836 B2
(45) Date of Patent: Sep. 13, 2005

(54) DIGITAL-SIGNAL-PROCESSING CIRCUIT, DISPLAY APPARATUS USING THE SAME AND LIQUID-CRYSTAL PROJECTOR USING THE SAME

(75) Inventor: Hideyuki Kitagawa, Kanagawa (JP)

(73) Assignee: Sony Corporation (JP)

( * ) Notice: Subject to any disclaimer, the term of this patent is extended or adjusted under 35 U.S.C. 154(b) by 619 days.

(21) Appl. No.: 09/988,758

(22) Filed: Nov. 20, 2001

(65) Prior Publication Data

US 2002/0063784 A1 May 30, 2002

(30) Foreign Application Priority Data

Nov. 24, 2000 (JP) ..................................... P2000-357181

(51) Int. Cl.⁷ .............................................. H04N 5/202
(52) U.S. Cl. ....................... 348/254; 348/674; 348/255; 348/678
(58) Field of Search ................................ 348/674, 675, 348/254, 255, 678; 358/518, 519; H04N 5/202

(56) References Cited

U.S. PATENT DOCUMENTS

| | | | | |
|---|---|---|---|---|
| 5,473,373 A | * | 12/1995 | Hwung et al. | 348/254 |
| 5,585,846 A | * | 12/1996 | Kim | 348/254 |
| 6,215,468 B1 | * | 4/2001 | Van Mourik | 345/605 |
| 6,462,735 B2 | * | 10/2002 | Naito | 345/204 |
| 6,614,174 B1 | * | 9/2003 | Urabe et al. | 313/504 |

* cited by examiner

*Primary Examiner*—John Miller
*Assistant Examiner*—Trang U. Tran
(74) *Attorney, Agent, or Firm*—Rader, Fishman & Grauer, PLLC; Ronald P. Kananen

(57) ABSTRACT

A digital-signal-processing circuit comprising an LUT memory used for storing a gamma-correction LUT used for carrying out gamma correction on an input digital video signal, and a front-stage signal-processing unit provided at a stage preceding the LUT memory and used for carrying signal processing, such as contrast adjustment, after the input digital video signal having a typical width of 8 bits is subjected to signal processing, such as contrast adjustment, in the signal-processing unit to be transformed into a digital video signal with a width of 11 bits. The 11-bit digital video signal is supplied to the LUT memory having an output bit count of 10 bits, which is smaller than the 11-bit width of the digital video signal supplied to the LUT memory but greater than the 8-bit width of the digital video signal input to the signal-processing unit.

6 Claims, 5 Drawing Sheets

DIGITAL-SIGNAL-PROCESSING CIRCUIT, DISPLAY APPARATUS USING THE SAME AND LIQUID-CRYSTAL PROJECTOR USING THE SAME

BACKGROUND OF THE INVENTION

The present invention relates to a digital-signal-processing circuit and a display apparatus and a liquid-crystal projector that employ the digital-signal-processing circuit. More particularly, the present invention relates to a digital-signal-processing circuit carrying out gamma correction on a digital video signal for driving a display device exhibiting a non-linear optical response characteristic and to a display apparatus and a liquid-crystal projector that employ the digital-signal-processing circuit.

A display apparatus exhibits a device-peculiar non-linear optical response to an input voltage. An example of such a display device is a liquid-crystal display apparatus employing liquid-crystal cells distributed among pixels to serve as electro-optical devices. An example of the optical-response characteristic of the display apparatus is a characteristic representing a relation between the transmittance and the applied voltage, as shown in FIG. 5. Such a characteristic is referred to as a V-T characteristic.

From a gradation-recognition characteristic of a human being, on the other hand, a desirable characteristic of a picture display apparatus display luminance, such as the transmittance, is an exponential function with respect to the level of an input voltage, as shown in FIG. 6. In order to obtain the desirable characteristic shown in FIG. 6 from a picture display apparatus with the V-T characteristic shown in FIG. 5, the voltage to be applied to the liquid-crystal device must be generated appropriately from the level of an input signal, as indicated by the non-linear relation shown in FIG. 7. The non-linear relation shown in FIG. 7 is referred to as a gamma-correction curve for an input digital video signal.

Generally known examples of the gamma correction include multi-break-point correction and correction based on an LUT (Look-up Table). These corrections entail the use of an analog or digital circuit. The LUT-based correction using a digital circuit has the problem of a large circuit scale. With a higher degree of IC integration achieved in the recent years, however, the limitation imposed by the large scale of the circuit is reduced. In addition, offering the merit of a high degree of precision, the LUT-based correction using a digital circuit has been becoming most popular.

In accordance with a related-art technology for implementing the LUT-based digital gamma correction, a digital gamma-correction circuit is used for carrying out the gamma correction as well as the transformation $N \geq n+2$, where notation n denotes the bit count of the input digital video signal supplied to the digital gamma-correction circuit and notation N denotes the bit count of the digital video signal output by the digital gamma-correction circuit. For details of the digital gamma-correction circuit, refer to documents such as Japanese Patent Laid-open No. 2000-20037. This related-art technology is intended for avoiding gradation deterioration in a gray zone.

To put it in detail, the gamma-correction curve representing a relation between the voltage to be applied to the liquid-crystal device and the level of an input signal has large gradients in a black-side zone and smaller ones in the gray zone, as shown in FIG. 7. These gradients indicate that, with the output-bit count set at the same value as the input-bit count, the gradation in the gray zone cannot be kept at the same degree of precision as the input gradation. The related-art technology described above carries out the gamma correction as well as the transformation $N \geq n+2$ in order to avoid gradation deterioration in the gray zone, where notation n denotes the number of bits input to the LUT and notation N denotes the number of bits output from the LUT.

With the related-art technology described above, however, the number of output bits rises with an increase in input-bit count. There is thus raised the problem that the output-pin count of a signal-processing IC for carrying out the gamma correction also increases. In addition, the input-pin count of a D/A converter provided at a later stage rises as well. As a result, the circuit scales of the ICs also increase and the power consumption rises as well, raising the problem of an increased amount of unnecessary radiation. Furthermore, the related-art technology described above is no more than a technology for avoiding gradation deterioration in a gray zone where the gradient of the gamma correction curve is small.

SUMMARY OF THE INVENTION

It is thus an object of the present invention to address the problems described above to provide a digital-signal-processing circuit capable of carrying out correction at a signal level having a large gamma-correction-curve gradient with a high degree of precision without increasing the number of bits output from a gamma correction LUT and to provide a display apparatus and a liquid-crystal projector that employ the digital-signal-processing circuit.

In order to achieve the object described above, the present invention provides a digital-signal-processing circuit having a gamma-correction unit for carrying out gamma correction of an input digital video signal by using a gamma correction table wherein the number of bits input to the gamma correction unit is set at a value greater than the number of bits output from the gamma correction unit. The digital-signal-processing circuit is used in a signal-processing system of a display apparatus employing electro-optical devices each serving as a display device. Examples of such an electro-optical device are a liquid-crystal cell, an organic electro-luminescent (EL) device and a cathode-ray tube. The digital-signal-processing circuit also is used in a signal-processing system of a projector.

In the digital-signal-processing circuit with such a configuration, as well as in the display apparatus and the projector that employ the digital-signal-processing circuit, by setting the number of bits input to the gamma correction unit employing a gamma correction table at a value greater than the number of bits output from the gamma correction unit, it is possible to carry out correction at a signal level in a black-side zone having a large gamma-correction-curve gradient with a high degree of precision.

BRIEF DESCRIPTION OF THE DIAGRAMS

DETAILED DESCRIPTION OF THE PREFERRED EMBODIMENT

Figure 1:
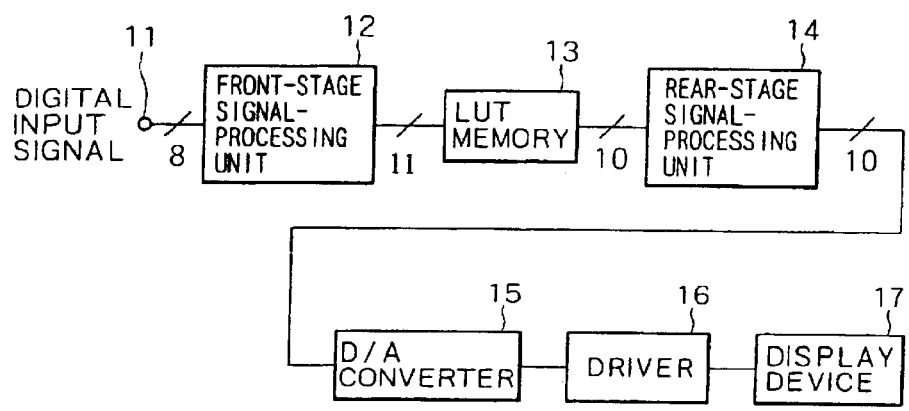
FIG. 1 is a block diagram showing a typical configuration of a signal-processing system employed in a display apparatus implemented by an embodiment of the present invention.

A preferred embodiment of the present invention is explained in detail by referring to the accompanying diagrams. FIG. 1 is a block diagram showing a typical configuration of a signal-processing system employed in a display apparatus implemented by an embodiment of the present invention.

An input terminal 11 of the system shown in FIG. 1 receives a digital video signal with a width of typically 8 bits. First of all, the digital video signal is supplied to a front-stage signal-processing unit 12. The front-stage signal-processing unit 12 carries out signal processing, such as brightness adjustment and contrast adjustment, on the digital video signal. The front-stage signal-processing unit 12 also converts the digital video signal into a digital video signal having a bit count greater than the input bit count. That is to say, the bit count is transformed from 8 bits into typically 11 bits. The 11-bit digital video signal is then supplied to a LUT (Look-up Table) memory 13 provided at a stage following the front-stage signal-processing unit 12.

Figure 7:
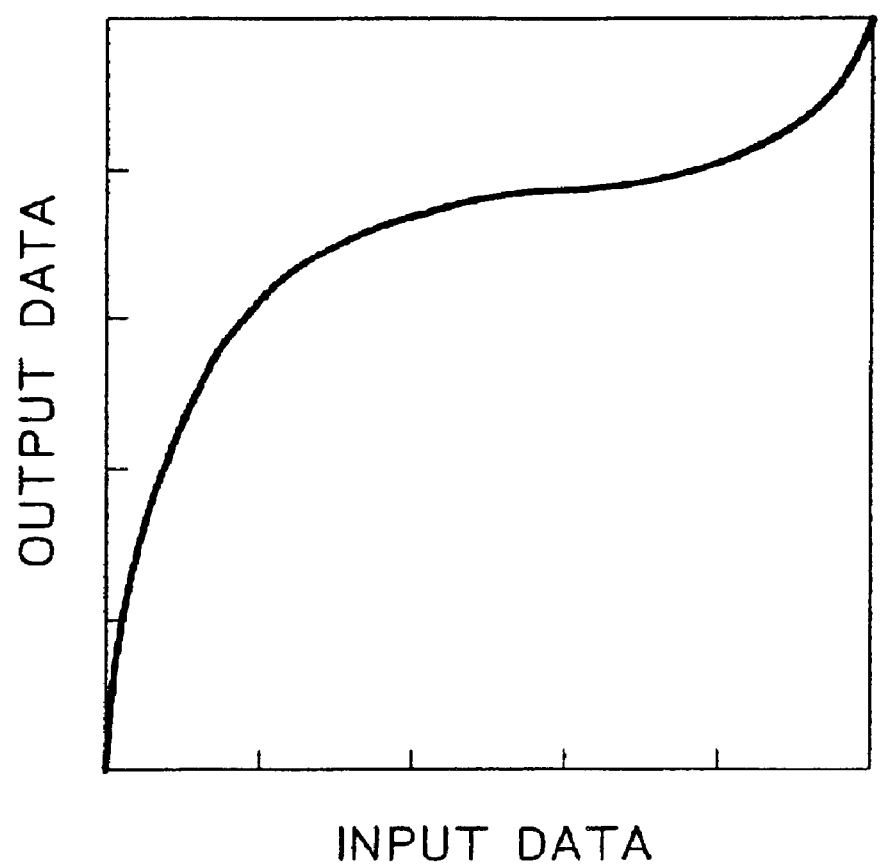
FIG. 7 is a characteristic diagram showing a gamma-correction curve.

The LUT memory 13 is typically a RAM used for storing gamma-correction data represented by a gamma-correction curve like the one shown in FIG. 7 as a LUT, which is used for carrying out gamma correction on the digital video signal. With regard to input/output bit counts of the LUT memory 13, typically, the number of bits input to the LUT memory 13 is 11 and the number of bits output from the LUT memory 13 is 10. The digital video signal completing the gamma correction using the LUT memory 13 is then supplied to a rear-stage signal-processing unit 14. The rear-stage signal-processing unit 14 carries out signal processing, such as fine adjustment of the correction and correction of color unevenness on the digital video signal, completing the gamma correction.

The digital video signal completing the signal processing in the rear-stage signal-processing unit 14 is supplied to a D/A converter 15 for converting the digital video signal into an analog video signal, which is then fed to a driver 16. The driver 16 carries out predetermined signal processing necessary for a picture display on the analog video signal output by the D/A converter 15 and then outputs the result of the processing to a display device 17. The display device 17 is a liquid-crystal display device comprising a matrix of pixels each serving as an electro-optical device implemented by a normally-white transmission liquid-crystal cell, which is not shown in the figure.

Figure 2:
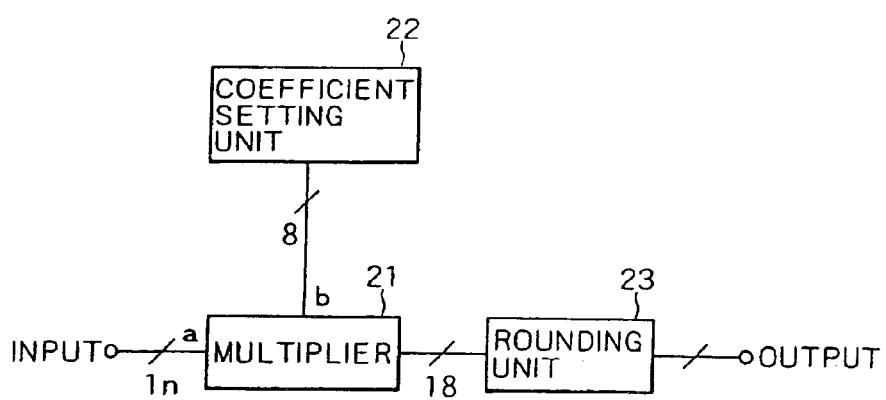
FIG. 2 is a block diagram showing a typical configuration of a contrast adjustment unit employed in a front-stage signal-processing unit of the signal-processing system.

FIG. 2 is a block diagram showing a typical configuration of a contrast-adjustment unit employed in the front-stage signal-processing unit 12. It should be noted that, in the front-stage signal-processing unit 12, contrast adjustment is multiplication carried out as part of the signal processing. By the way, brightness adjustment is addition carried out as part of the signal processing. As is obvious from FIG. 2, the contrast-adjustment unit employed in this embodiment comprises a multiplier 21, a coefficient setting unit 22 and a rounding unit 23.

The multiplier 21 receives the digital video signal to be weighted by a gain and a coefficient set by the coefficient setting unit 22. The multiplier 21 multiplies the digital video signal by the coefficient used as the gain, weighting the signal by the gain. For example, the digital video signal is 10 bits wide and the coefficient is 8 bits in width. In this case, the product obtained as a result of the multiplication is 18 bits wide.

If the 18-bit digital video signal obtained as a result of the multiplication is supplied as it is to a circuit provided at a stage following the multiplier 21, the scale of the circuit needs to be increased. In order to solve this problem, the rounding unit 23 provided at a stage following the multiplier 21 rounds the result of the multiplication by counting the result's fractions over ½ as one and disregarding the rest. The rounding unit 23 thus outputs a digital video signal having a predetermined number of bits. Typically, the 18-bit digital video signal is rounded to a digital video signal with a bit count matching the number of bits input to the LUT memory 13. The bit count matching the number of bits input to the LUT memory 13 is typically 11. The 11-bit digital video signal is then supplied to the LUT memory 13.

Figure 3:
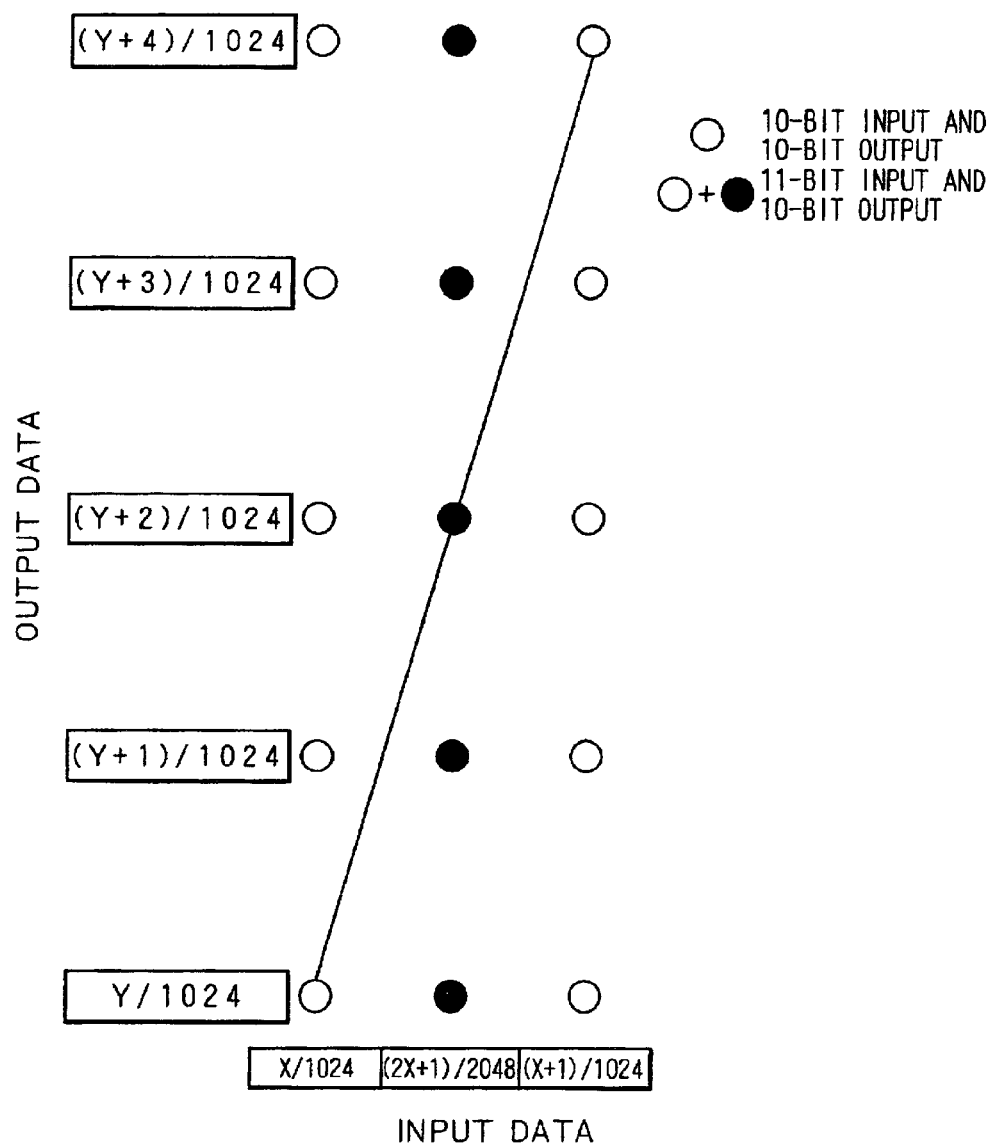
FIG. 3 is a diagram showing a model of LUT data.

Next, with regard to the number of bits input to the LUT stored in the LUT memory 13 and the number of bits output from the LUT, the use of the relation among pieces of data, which are shown in FIG. 3, is taken into consideration. FIG. 3 is a diagram showing a model of LUT data.

Consider a case in which a 10-bit output digital video signal is processed. A 10-bit output digital video signal has 1,024 ($=2^{10}$) different values. Assume that the input digital video signal is also 10 bits in width. In this case, the values of data input to the LUT memory 13 and data output from the LUT memory 13 are each represented by a lattice point in FIG. 3. Each lattice point is shown as a white circular mark indicated by the symbol ○ in FIG. 3. As a case of a large correction-curve gradient, consider the case in which lattice points a and b are taken in the gamma-correction table.

Assume that the multiplication result produced by the multiplier 21 shown in FIG. 2 is represented by an 11-bit expression, which can have 2,048 ($=2^{11}$ different values). Also assume that the result of multiplication has a value of $(2X+1)/2,048$. Let the number of bits input to the LUT memory 13 be 10. The value $(2X+1)/2,048$ is subjected to an operation of counting the value's fractions over ½ as one and disregarding the rest to generate input data having a value of $(X+1)/1,024$, which is a rounded-up value of $(2X+1)/2,048$. The data $(X+1)/1,024$ input to the LUT memory 13 is transformed by the gamma-correction table stored in the LUT memory 13 into output data $(Y+4)/1,024$. The gamma-correction table stored in the LUT memory 13 is represented by the straight line shown in FIG. 3. The input data $(X+1)/1,024$ and the output data $(Y+2)/1,024$ are the coordinates of a point on this straight line.

Now, assume that the input digital video signal is 11 bits in width. In this case, values of input/output data are each represented by a lattice point shown as a black circular mark indicated by the symbol ● replacing the white circular mark ○ in FIG. 3. Each black circular mark indicated by the symbol ● represents a lattice point c. To be more specific, the result of multiplication $(2X+1)/2,048$ is input to the LUT memory 13 as it is as represented by the symbol ● at the bottom. The output of the LUT memory 13 is the symbol ● on the straight line representing the gamma-correction table. The symbol ● on the straight line representing the gamma-correction table is output data having a value of $(Y+2)/1,024$ for the input data of $(2X+1)/2,048$.

As is obvious from the description given above, with regard to the number of bits input to the LUT stored in the LUT memory 13 and the number of bits output from the LUT, by increasing the number of bits input to the LUT to 11 with the number of bits output from the LUT kept at 10 as it is, it is possible to carry out correction at a signal level in a black-side zone having a large gamma-correction-curve gradient, as shown in FIG. 7, with a high degree of precision.

In addition, this digital-signal-processing circuit may be manufactured as an IC. In this case, by not increasing the number of output bits as described above, it is possible to prevent the output-pin count of the signal-processing IC and the input-pin count of the D/A converter 15 provided at the stage following the LUT memory 13 from increasing. Moreover, the power consumption and the amount of unnecessary radiation also can be prevented from rising.

Furthermore, in consideration of the digital-signal-processing circuit including the signal-processing unit 12 at the stage preceding the LUT memory 13 as a whole, for an input digital video signal of 8 bits, the output digital video signal has a bit count of 10, which is an increase of 2 over 8. It is thus possible to sustain the bit count of the digital video signal allocated to the gray zone with a small gamma-correction-curve gradient. As a result, gradation deterioration in the gray zone can be avoided.

In the embodiment described above, the number of bits input to the system is 8, the number of bits input to the LUT is 11 and the number of bits output from the LUT, that is, the number of bits output from the system, is 10. It should be noted, however, that the scope of the present invention is not limited to this embodiment. That is to say, the present invention does not prescribe the bit counts described above. Instead, the present invention prescribes relations among the bit counts.

In addition, in the embodiment described above, the digital gamma correction is applied to a display apparatus wherein a normally-white transmission liquid-crystal display device is employed as a display device. It is worth noting, however, that in accordance with the present invention, the digital gamma correction also can be similarly applied to a display apparatus wherein a normally-black liquid-crystal display device or a reflective liquid-crystal display device is employed as a display device. Furthermore, in accordance with the present invention, the digital gamma correction can be applied not only to such a liquid-crystal display apparatus but also to a general display apparatus employing an electro-optical device with a non-linear response characteristic as a display device in the same way. Examples of such an electro-optical device include an organic EL device and a cathode ray tube.

Figure 4:
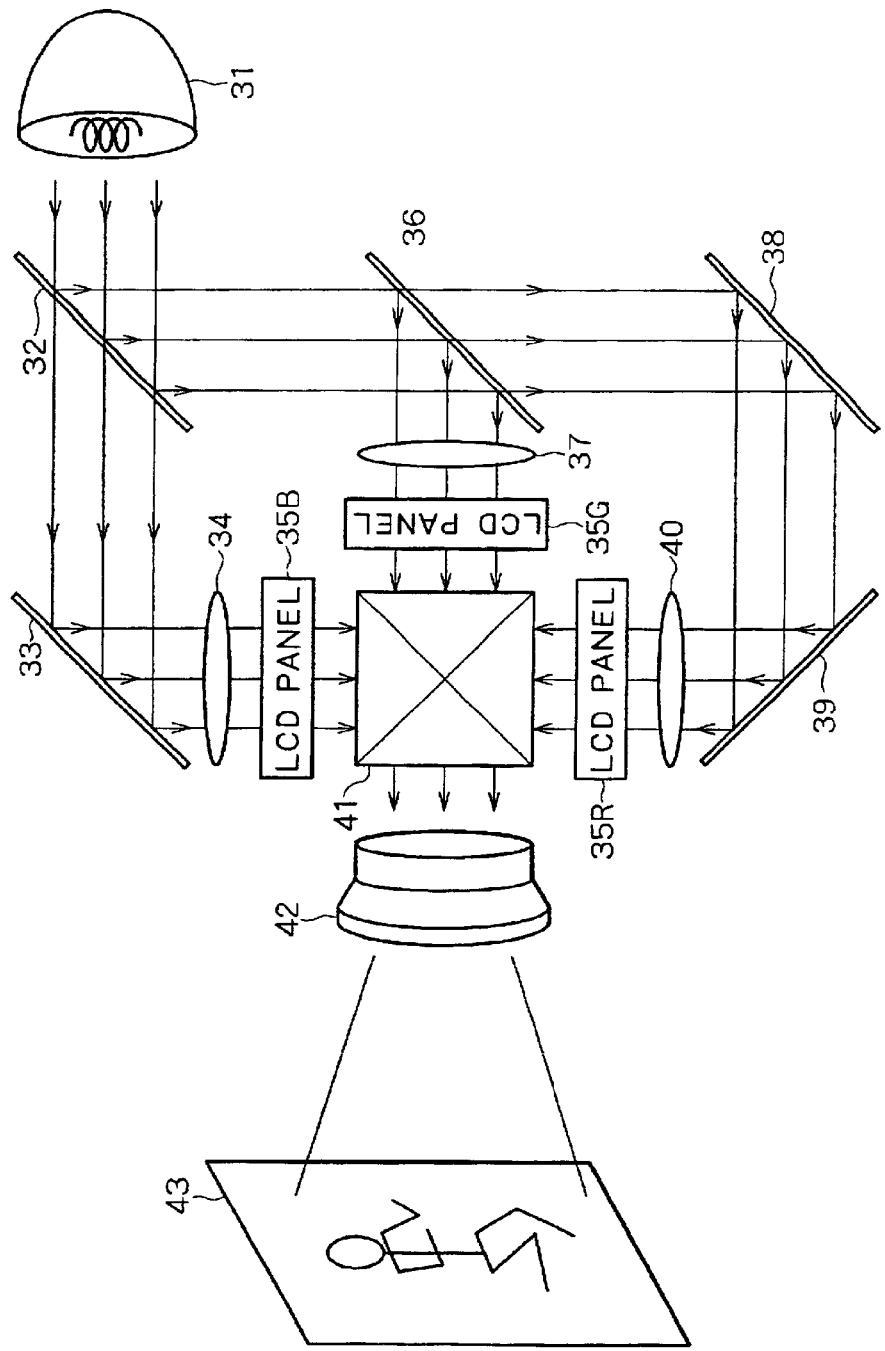
FIG. 4 is a diagram showing the configuration of a liquid-crystal projector in a simple and plain manner.
Figure 5:
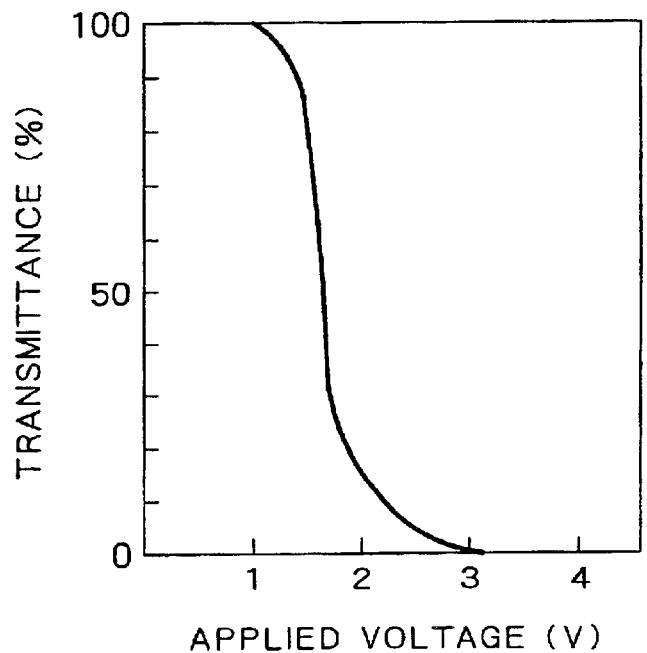
FIG. 5 is a diagram showing a V-T characteristic, which is a characteristic representing a relation between the transmittance and the applied voltage of a normally white transmission liquid crystal device.
Figure 6:
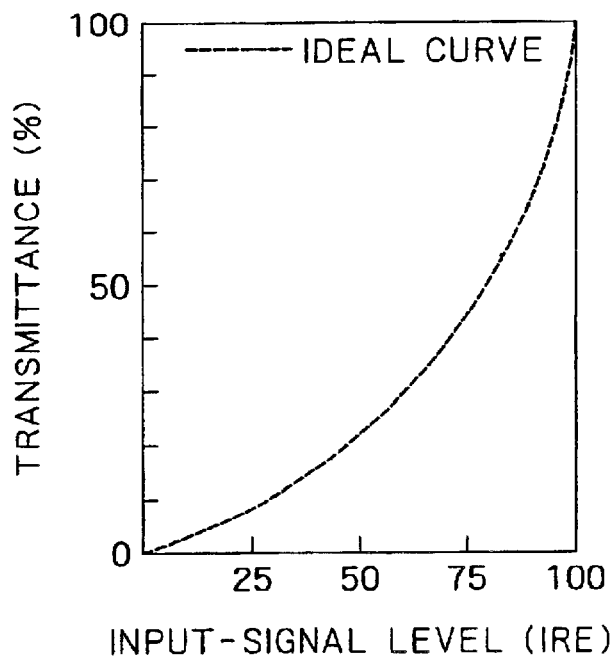
FIG. 6 is a diagram showing a characteristic representing a relation between the level of an input signal and the ideal transmittance.

Moreover, the digital-signal-processing circuit provided by the present invention also can be used as a digital-signal-processing circuit of a liquid-crystal projector. FIG. 4 is a diagram showing the configuration of the liquid-crystal projector in a simple and plain manner.

In the liquid-crystal projector shown in FIG. 4, white beams emitted by a light source 31 hit a first beam splitter 32. The first beam splitter 32 passes on only a predetermined color component of the white beams. An example of the predetermined color component is a B (blue) optical component, which has a smallest wavelength. The remaining color components of the white beams are reflected by the first beam splitter 32. The optical path of the B optical component passing through the first beam splitter 32 is changed by a mirror 33. The B optical component is radiated to a B LCD panel 35B by way of a lens 34.

The optical components reflected by the first beam splitter 32 arrive at a second beam splitter 36, which reflects typically a G (green) optical component but passes on a R (red) optical component. The G optical component reflected by the second beam splitter 36 is radiated to a G LCD panel 35G by way of a lens 37. The optical path of the R optical component passing through the second beam splitter 36 is changed by mirrors 38 and 39. The R optical component is radiated to a R LCD panel 35R by way of a lens 40.

Each of the R LCD panel 35R, the G LCD panel 35G and the B LCD panel 35B comprises a first substrate, a second substrate, a liquid-crystal layer and a filter layer. The first substrate comprises a plurality of pixels laid out to form a matrix. The second substrate is provided to face the first substrate, being separated away from the first substrate by a predetermined gap. The liquid-crystal layer is placed between the first and second substrates. The filter layer is a filter for the color of an optical beam passing through the LCD panel 35 containing the filter layer. The R, G and B optical components passing through the R LCD panel 35R, the G LCD panel 35G and the B LCD panel 35B are optically synthesized by a cross prism 41. Synthesized beams emitted by the cross prism 41 are projected by a projection prism 42 on a screen 43.

The R LCD panel 35R, the G LCD panel 35G and the B LCD panel 35B, which are employed in the projector with the configuration described above, are provided with digital-signal-processing circuits for the R, G and B colors. The digital-signal-processing circuits, each having the configuration shown in FIG. 1, carry out digital signal processing before conversion of processing results into R, G and B analog video signals, which are then supplied to the R LCD panel 35R, the G LCD panel 35G and the B LCD panel 35B, respectively. A D/A converter used for the conversion of a processing result into an analog video signal is the same as the D/A converter 15 shown in FIG. 1. As described earlier, these digital-signal-processing circuits are each capable of carrying out correction at a signal level in a black-side zone having a large gamma-correction-curve gradient with a high degree of precision, so that it is possible to realize a picture display emphasizing gradation on the black side.

By the way, a liquid-crystal projector can be a rear-type projector or a front-type projector. In general, a rear-type liquid-crystal projector is used as a projection TV for moving pictures, while a front-type liquid-crystal projector is used as a data projector. In recent years, in projection TVs, there is observed a trend to emphasize gradation on the black side. Thus, the digital-signal-processing circuit implemented by the embodiment described above is especially suitable for a signal-processing system of a projection TV.

It should be noted that applications of the present invention are not limited to a signal-processing system of a rear-type liquid-crystal projector, that is, a projection TV. That is to say, the present invention also can be applied to a signal-processing system of a front-type liquid-crystal projector, that is, a data projector, in the same way. In addition, while the description given so far explains an application of the present invention to a color liquid-crystal projector, the present invention also can be applied to a monochrome liquid-crystal projector as well.

In accordance with the present invention described above, in a digital-signal-processing circuit having a gamma-correction unit for carrying out gamma correction on an input digital video signal by using a gamma-correction table and a display apparatus and a liquid-crystal projector that employ this digital-signal-processing circuit, with regard to input and output bit counts of the gamma-correction unit, the number of bits input to the gamma-correction unit is set at a value greater than the number of bits output from the gamma-correction unit, so that it is possible to carry out correction at a signal level in a black-side zone having a large gamma-correction-curve gradient with a high degree of precision. In addition, this digital-signal-processing circuit may be manufactured as an IC. In this case, by not increasing the number of output bits, as described above, it is possible to prevent the output-bit count of the signal-processing IC and the input-bit count of the D/A converter 15 provided at the stage following the LUT memory 13 from increasing. Moreover, the power consumption and the amount of unnecessary radiation also can be prevented from rising.

While the preferred embodiment of the present invention has been described using the specific terms, such description is for illustrative purposes only, and it is to be understood that changes and variations may be made without departing from the spirit or scope of the following claims.

What is claimed is:

1. A digital-signal-processing circuit having a gamma-correction unit for carrying out gamma correction on an input digital video signal by using a gamma-correction table, wherein the number of bits input to said gamma-correction unit is set at a value greater than the number of bits output from said gamma-correction unit, a signal-processing unit is provided at a stage preceding said gamma-correction unit and used to apply an arbitrary gain to said input digital video signal; and the number of bits output from said gamma-correction unit is set at a value greater than the number of bits input to said signal-processing unit.

2. A display apparatus comprising:

display means employing electro-optical devices, each having a non-linear response characteristic;

a digital-signal-processing circuit having a gamma-correction unit for carrying out gamma correction on an input digital video signal by using a gamma-correction table, wherein the number of bits input to said gamma-correction unit is set at a value greater than the number of bits output from said gamma-correction unit; and D/A-conversion means for converting a digital video signal obtained as a result of signal processing carried out by said digital-signal-processing circuit into an analog video signal and outputting said analog video signal to said display means;

wherein said digital-signal-processing circuit has a signal-processing unit provided at a stage preceding said gamma-correction unit and used to apply an arbitrary gain to said input digital video signal; and the number of bits output from said gamma-correction unit is set at a value greater than the number of bits input to said signal-processing unit.

3. A display apparatus according to claim 2 wherein said electro-optical devices are each a liquid-crystal cell.

4. A display apparatus according to claim 2 wherein said electro-optical devices are each an organic electro-luminescent device.

5. A display apparatus according to claim 2 wherein said electro-optical devices are a cathode ray tube.

6. A liquid-crystal projector comprising:

an LCD panel comprising a matrix of pixels each implemented by a liquid-crystal cell;

radiation means for radiating beams to the area of said LCD panel;

a digital-signal-processing circuit having a gamma-correction unit for carrying out gamma correction on an input digital video signal by using a gamma-correction table, wherein the number of bits input to said gamma-correction unit is set at a value greater than the number of bits output from said gamma-correction unit; and D/A-conversion means for converting a digital video signal obtained as a result of signal processing carried out by said digital-signal-processing circuit into an analog video signal and outputting said analog video signal to said display means; wherein said digital-signal-processing circuit has a signal-processing unit provided at a stage preceding said gamma-correction unit and used to apply an arbitrary gain to said input digital video signal; and the number of bits output from said gamma-correction unit is set at a value greater than the number of bits input to said signal-processing unit.

* * * * *